May 19, 1936.  E. EGER  2,041,534

INNER TUBE

Filed Jan. 19, 1935

INVENTOR.
ERNST EGER

BY

ATTORNEY.

Patented May 19, 1936

2,041,534

UNITED STATES PATENT OFFICE 2,041,534

INNER TUBE

Ernst Eger, Grosse Pointe Park, Mich., assignor to United States Rubber Company, New York, N. Y., a corporation of New Jersey Application January 19, 1935, Serial No. 2,527

6 Claims. (Cl. 152—13)

My invention relates to inner tubes for pneumatic tires and more particularly to inner tubes for automobile tires having substantially irregular outer surfaces to permit the escape of air from between the surface of the tube and the enclosing automobile tires or casings.

In my Letters Patent No. 2,014,129 dated September 10, 1935, I have disclosed several modifications of venting grooves on the outer surfaces of inner tubes which have for their purposes the venting of air which would otherwise be entrapped between the inner tube and a surrounding casing.

The present application discloses certain improvements over the structures disclosed by my prior applications.

In the venting grooves of my present application cross-overs between circumferentially and transversely extending ribs are eliminated and thereby provide unobstructed passageways from the outer or tread portions of the tire and tube to the rim area. The shape of the ribs has been made shorter and wider. Also provision is made for venting the seam area of the tube.

The accompanying drawing illustrates certain preferred embodiments of my invention, in which:—

Referring to Figs. 1 to 5, inclusive, an inner tube 1 of rubber composition is provided with a flexible valve stem 2 of rubber or rubber composition terminating in a metallic valve element, as is well understood in the art. Along the outer or tread surface of the inner tube a plurality of circumferentially extending ribs 4 are interrupted for a distance at least at one area in the circumference of the inner tube. It is to be understood that the number of ribs 4 may be varied, as desired, in order to provide the desired number of grooves 5 intermediate thereof.

Figure 1:
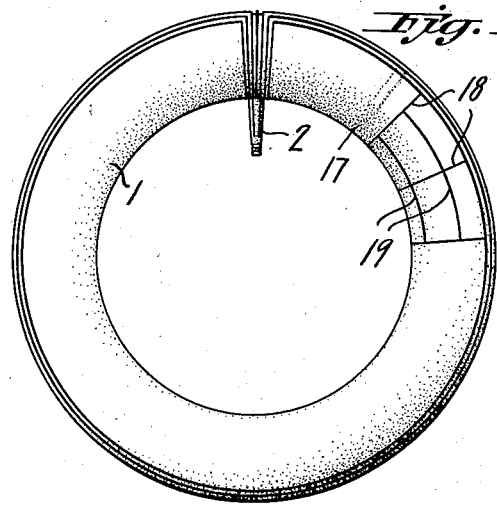
Fig. 1 is a side elevational view of an inner tube embodying my invention.
Figure 2:
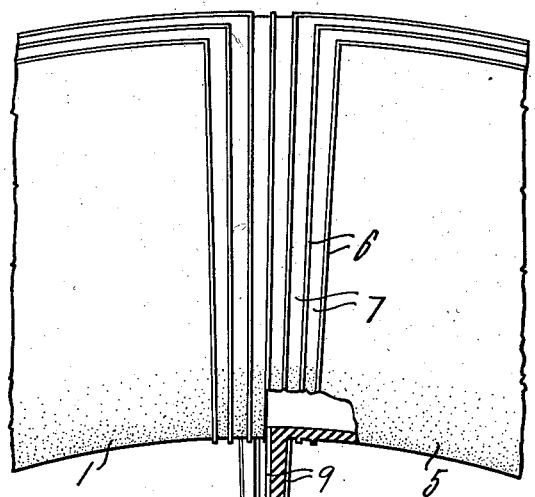
Fig. 2 is an enlarged view partially elevational and partially in section of a portion of the tube.
Figure 3:
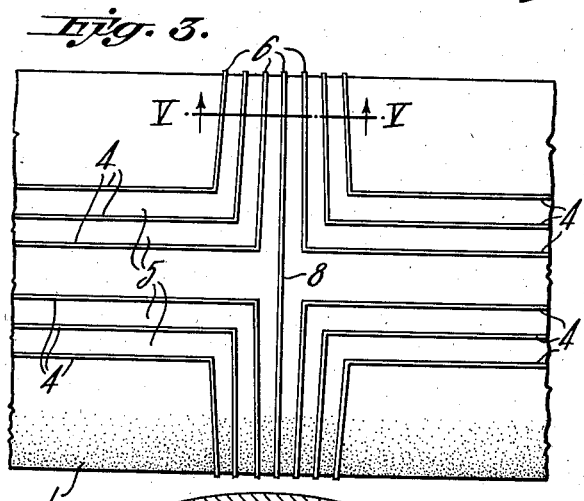
Fig. 3 is an enlarged edge view of a portion of the inner tube.
Figure 4:
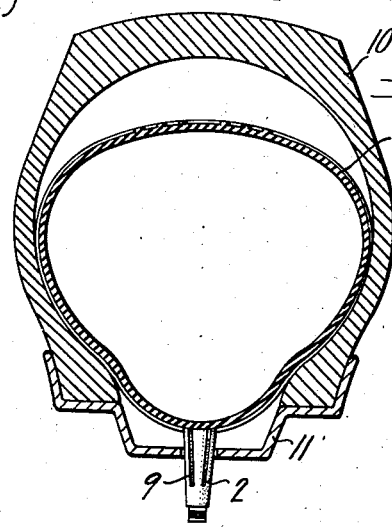
Fig. 4 is a view in cross-section illustrating an assembly of the inner tube in a casing on a drop center rim.

As is clearly shown in Fig. 3, the ends of the ribs 4 terminate in offset relation, the ends of the inner ribs extending circumferentially a greater distance than those of the outer ribs. The ends of the ribs 4 are connected to transversely extending ribs 6 which define a plurality of transversely extending grooves 7, connecting directly and in an unobstructing manner with the grooves 5. If desired, a circumferential rib 8 may be placed intermediate the ends of the ribs 4 to form a partition wall. The transversely extending ribs 6 are carried around the inner tube to the rim engaging area, and preferably in the area or zone of the valve stem 2. As shown in Figs. 1, 2, and 4, the valve stem may be provided with longitudinal grooves 9 which cooperate with the transverse grooves 8 to permit the escape of air trapped between the inner tube and a tire casing 10 outwardly of the valve stem past a rim 11.

Figure 5:
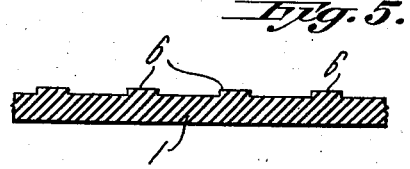
Fig. 5 is an enlarged view of a portion of the inner tube taken along on section line V—V of Fig. 4.

Referring to Fig. 5, the shape of the ribs 4 and 6 is preferably squatty, that is they are broader than they are high. This is in order that the mold grooves forming them shall not be so small as to become obliterated by use or filled with deposited matter. At the same time the ribs are sufficiently strong and durable to maintain venting spaces between the inner tube and the casing without causing undue flattening of the ribs or embedding them into the material of the casing. In practice it has been found that ribs having a height of less than .005 inch are undesirable, while ribs having a height in excess of .016 inch are apt to produce an undesirable flow or thinning of rubber at the base of the ribs. In an inner tube having a rubber wall of the order of .055 inch, ribs having a height of .012 inch, and a width of .060 inch are illustrated in Fig. 5. It is to be understood, however, that these values are given by way of illustration of the invention and not by way of limitation thereof since various changes may be made therein without departing from the teaching of the invention.

Figure 6:
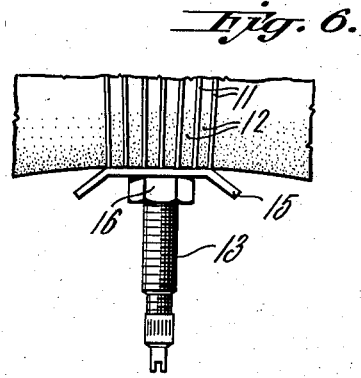
Fig. 6 is an enlarged view of a portion of an inner tube embodying my invention in cooperation with a metallic stem valve.

Referring to Fig. 6, the transverse ribs 11 and venting grooves 12 correspond to the ribs 6 and grooves 7, respectively, and may cooperate with a standard metal valve stem 13 having the usual bridge washer hex-nut 15 and locking nut 16, if desired.

With an inner tube having a seam, such as a lapped seam 17, shown in Fig. 1, which materially increases the thickness of the rubber in any area of the tube, the thickened area is the last to expand upon the inflation with a liability to trap air at and/or adjacent to the thickened area. To eliminate the effect of such pockets, I provide transverse and longitudinal venting ribs 18 and 19, respectively, on the tube surface near the seam. Preferably the ribs should not extend into the seam area as they might interfere with the quality of the seam. The mold grooves forming these ribs also prevent the accumulation of air at the seam during molding of the tube and thereby improve the seams.

While I have shown and described certain present preferred embodiments of my invention, it is to be understood that it may be otherwise embodied within the spirit of the invention and the scope of the appended claims.

Having now described my invention, what I claim and desire to protect by Letters Patent is:—

1. An inner tube for a pneumatic tire having small superficial venting means comprising a pair of spaced ribs extending circumferentially of the outer portion of the tube to define a venting groove, at least one of said ribs being interrupted, and spaced transversely extending ribs joined to the circumferentially extending rib at the interrupted area and extending inwardly of the tube to discharge at the rim engaging area of the tube whereby a continuous uninterrupted venting groove is provided from the outer portion of the tube to the rim engaging area.

2. An inner tube for a pneumatic tire having small superficial venting means comprising a pair of spaced ribs extending circumferentially of the outer portion of the tube to define a venting groove, said ribs being interrupted, and spaced transversely extending ribs joined to the circumferentially extending ribs at the interrupted areas and extending inwardly of the tube to discharge at the rim engaging area of the tube, whereby an unobstructed flow of air from the outer portion of the tube to the rim engaging portion is permitted.

3. An inner tube for a pneumatic tire having small superficial venting means comprising a pair of spaced ribs extending circumferentially of the outer portion of the tube to define a venting groove, said ribs being interrupted, and spaced transversely extending ribs joined to the circumferentially extending ribs at the interrupted areas and extending inwardly of the tube to discharge at the valve stem, whereby an unobstructed flow of air from the outer portion of the tube to the valve stem is permitted.

4. An inner tube for a pneumatic tire having small superficial venting means comprising a plurality of spaced ribs extending circumferentially of the outer or tread portion of the tube and defining intermediate grooves, said ribs terminating in offset relation at one area of the tire, spaced transversely extending ribs connected to said circumferentially extending ribs adjacent the ends of the latter for defining a plurality of grooves having unobstructed communication with the circumferentially extending grooves, and a continuous transverse rib disposed centrally of the first mentioned transversely extending ribs and forming a partition wall, said transversely extending grooves communicating with the rim engaging portion of the tube at the valve stem.

5. An inner tube having a transversely extending band of thicker rubber than the remainder of the tube whereby said band retards the local inflation of the tube and superficial venting means applied to the tube in the area of the band for preventing the pocketing of air at and near the band.

6. An inner tube having a transversely extending seam offering greater resistance to inflation of the tube than the main tube body and superficial venting means applied to the tube in the seam area for preventing the pocketing of air at and near the seam.

ERNST EGER.